April 29, 1924.
H. R. MEYER
ELECTRICAL BRAKING
Filed July 22, 1921
1,492,138
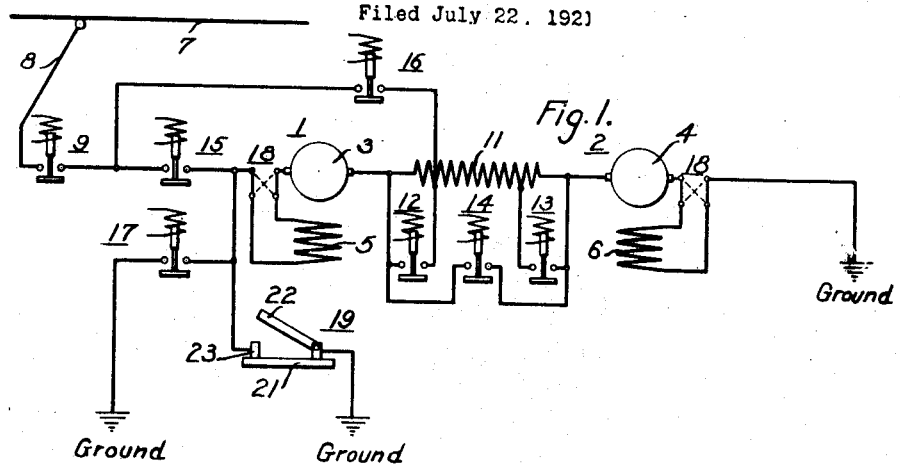
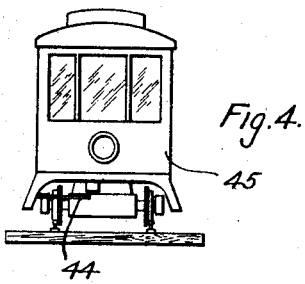
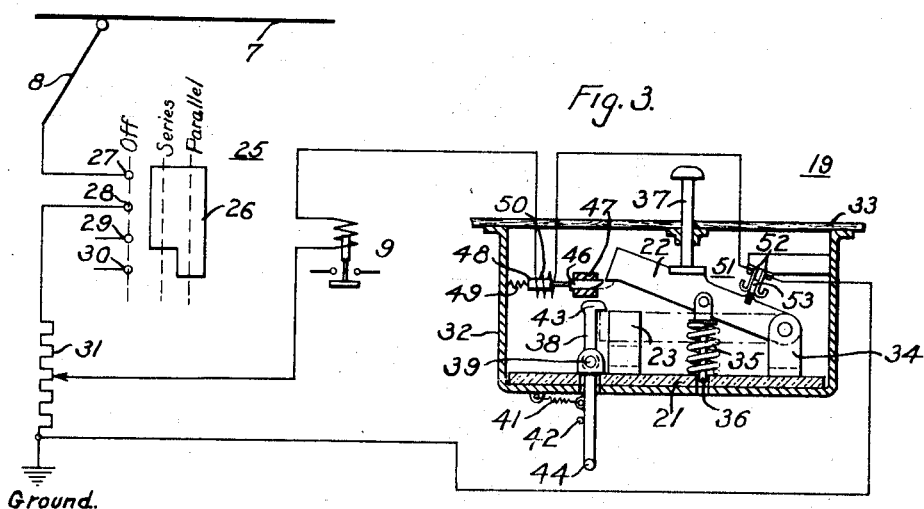
WITNESSES:
John Whiting
H. C. Lowe
INVENTOR
Harry R. Meyer.
BY
Merley & Carr
ATTORNEY Patented Apr. 29, 1924.

1,492,138

UNITED STATES PATENT OFFICE.

HARRY R. MEYER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL BRAKING.

Application filed July 22, 1921. Serial No. 486,708.

*To all whom it may concern:*

Be it known that I, HARRY R. MEYER, a citizen of the United States, and a resident of Wilkinsburg, in the county of Allegheny and State of Pennsylvania, have invented a new and useful Improvement in Electrical Braking, of which the following is a specification.

My invention relates to control systems and it has particular relation to control systems for effecting electrical braking of a plurality of motors utilized for driving a railway vehicle.

One object of my invention is to provide a method of effecting electrical braking of a plurality of vehicle motors upon failure of the air or the mechanical brakes.

A second object of my invention is to provide a method of effecting electrical braking of a plurality of driving motors upon the failure of the source of power that energizes the actuating coils of a plurality of contactors of the control system.

Another object of my invention is to make it relatively difficult or inconvenient for the operator to start the motors after effecting dynamic braking, thereby tending to prevent the operator from frequently employing dynamic braking when it is unnecessary. In this connection, it will be understood by those skilled in the art that dynamic braking tends to decrease the period of usefulness of motors.

A further object of my invention is to prevent the line switch from closing and a dynamic-braking circuit from being established simultaneously.

Briefly speaking, my invention consists in providing a switching device that may be actuated by an operator placing his foot thereon, if the master controller has been returned to its "off" position, and by providing a latching device which may be operated only from without the car, thereby requiring the operator to leave his cab to release the latching device before he can re-energize the control system.

It is possible to have the latching device so arranged that it may be reset from some point remote from the motorman's station, as the chief requisite is to so design the device that the motorman will be disinclined to employ dynamic braking frequently.

For a better understanding of my invention, reference may be made to the accompanying drawing, Figure 1 of which is a schematic view of the main circuits of a control system embodying my invention;

Fig. 2 is a sequence chart showing the order of closure of a plurality of contactors employed in the control system illustrated in Fig. 1;

Fig. 3 is a diagrammatic view of a portion of the auxiliary control system employed to govern the contactors shown in Fig. 1 and of a switching device constructed in accordance with my invention; and Fig. 4 is a view, in end elevation, of a portion of an electric railway vehicle on which a control system constructed in accordance with my invention is mounted.

Referring particularly to Fig. 1 of the drawing, a plurality of motors 1 and 2 having armatures 3 and 4, respectively, and corresponding field-magnet windings 5 and 6, may be energized from a source of electrical energy, such for example, as a trolley 7, through a trolley-pole 8 and a line switch 9. A starting resistor 11 is employed for governing the current traversing the motors 1 and 2.

A plurality of accelerating contactors 12, 13 and 14 are employed for shunting the starting resistor 11. Series contactor 15 and parallel-connecting contactors 16 and 17 are employed for connecting the motors 1 and 2 in series and in parallel relation, in accordance with well-known practice.

A master reverser 18 is employed for reversing the connections of the series field-magnet windings 5 and 6 to the corresponding armatures 3 and 4 of the motors 1 and 2.

A switching device 19, which is more clearly shown in Fig. 3 of the drawing, is provided with an insulating base 21, a movable blade 22 and a stationary contact member 23 for connecting the motors 1 and 2 in a dynamic-braking circuit, as will hereinafter be more fully described.

Referring particularly to Fig. 3 of the drawing, a master controller 25 having a movable contact segment 26 and a plurality of contact terminals 27 to 30, inclusive, is provided with an "off" position and a plurality of operating positions. An auxiliary or control resistor 31 is employed for energizing the actuating coils of the contactors that are illustrated in Fig. 1 of the drawing, in accordance with a familiar practice.

The switching device 19, which has been partially described previously in connection with the main circuits that are illustrated in Fig. 1, comprises a casing member 32, a cover member 33, which is preferably placed at the same elevation as the car floor and constitutes a part thereof, and the insulating base member 21 on which the movable switch member 22 is pivotally mounted by means of a holding member or switch jaw 34. The movable member 22 is biased to its upper position, which is that shown in Fig. 3 of the drawing, by means of a resilient member 35, which is mounted upon a suitable guide member or rod 36.

The movable member 22 may be actuated to its closed position by pressure upon a push-button device, such as a bolt 37. A latching device 38 is pivotally mounted upon the base member 21 by means of a pin 39. A spring 41 tends to rotate the latching device 38 in a clockwise or latching direction, a stop member 42 limiting the travel of the latching member. The latching member 38 is provided with an enlarged end portion 43 which prevents the movable member 22 from returning to the position illustrated by solid lines in Fig. 3 of the drawing after the member 22 has been once actuated to the position illustrated by broken lines in Fig. 3.

The latching device 38 may be released by applying pressure to the handle 44 in a counter-clockwise direction. The handle 44 projects under the car body 45, as illustrated in Fig. 4 of the drawing, and thus it is necessary for the operator to dismount from the car to enable him to actuate the latching member 38.

A pin, or holding member 46 is slidably mounted upon a stationary block 47 to prevent the movable switching member 22 from being actuated to its closed position when the actuating coil of the line switch 9 is energized, in a manner hereinafter more fully described.

An armature or core member 48 is mechanically connected to the pin 46, being biased to the position illustrated in Fig. 3 of the drawing by means of a spring 49. An actuating coil 50, which is connected in series relation with the actuating coil of the line switch 9, is employed to actuate the armature member 50 toward the stationary contact member 23, thereby causing the pin 46 to assume its locking position, which is illustrated by broken lines in Fig. 3.

An interlock 51, comprising a plurality of stationary contact fingers 52, which are secured to the casing member 32, and a movable member 53, which is insulatedly mounted upon the movable contact member 22, prevents the energization of the actuating coil of the line switch 9, unless the switching device 19 is in its normal or "off" position, which is that shown in the drawing.

The operation of the control system in Fig. 1 will be understood by those skilled in the art, and, therefore, will be described only in a general manner. The motors 1 and 2 are first connected in series relation by the closure of the line switch 9 and the series contactor 15, in accordance with step $a$ of the sequence chart, shown in Fig. 2 of the drawings. Starting resistor 11 is then shunted by closure of the accelerating contactors 12, 13 and 14, in accordance with steps $b$, $c$ and $d$ of the sequence chart.

The motors 1 and 2 are next connected in parallel relation by means of the line switch 9 and the parallel connecting contactors 16 and 17, in accordance with position $e$ of the sequence chart. Contactors 12 and 13 are then closed to bring the motors 1 and 2 to full speed.

To effect dynamic braking of the motors 1 and 2, it is necessary that the master controller 25 be actuated from its operating position to its "off" position and to throw the master reverser into its reverse position, thereby reversing the relation of the field-magnet windings 5 and 6 to the corresponding armatures 3 and 4 of the motors 1 and 2.

After the master controller has been actuated to its reverse position, the operator steps upon the bolt 37, thereby actuating the movable contact member 22 downwardly past the head 43 of the latching device 38 until it engages the stationary contact member 23. The pin 46 is actuated to the position illustrated in Fig. 3 by the spring 49 under normal conditions, that is, during the de-energization of the actuating coil 50.

The latching member 38 is at this time so actuated by the spring 41 that the head 43 of the latching member 38 prevents the movable contact member 22 from being actuated upwardly by the resilient member 35.

When the movable contact member 22 has been actuated to its lower position, and motor field-windings 3 and 4 have been reversed, a dynamic-braking circuit is established (see Fig. 1 of the drawing) from Ground through the main reverser 18, series field-magnet winding 6 and armature 4 of the motor 2, starting resistor 11, armature 3 and series field-magnet winding 5 of the motor 1, main reverser 18, and stationary contact member 22 and movable contact member 23 of the switching device 19 to Ground.

It is apparent by an examination of Fig. 1 that no electrical energy is required to actuate any of the contactors illustrated in Fig. 1 to effect dynamic braking, since only the switching device 19 need be actuated by the operator.

While I have shown the switching device 19 as foot-operated, it is apparent that it could, if desired, be operated manually.

When the operator has brought the car to a stop, it is necessary for him to dismount and actuate the latching member 38 in a counter-clockwise direction, by means of the handle 44, before he can reenergize the motors 1 and 2; for the reason that the actuating coil of the line switch 9 can not be energized, when the movable member 22 is actuated to its lower position, as the contact segment 53 no longer engages the control fingers 52. As soon as the head 43 of the latching member 38 no longer engages the movable member 22, the resilient member 35 actuates the movable member 22 in a clockwise direction, thereby breaking the dynamic-braking circuit.

When the movable member 22 has returned to its upper position, as shown in Fig. 3 of the drawing, the interlock formed by the contact segment 53 and the control fingers 52 is closed.

When the master controller 25 is actuated to its "off" position, or to either its series or its parallel position, a circuit is established from the trolley 7 through control fiingers 27 and 28, which are bridged by the contact segment 26 of the master controller 25, a portion of the control resistor 31, actuating coil of the line switch or circuit-breaker 9, the actuating coil 50, constituting a part of the locking device 46 of the switching device 19, and control fingers 52, which are bridged by contact segment 53, to Ground.

When the actuating coil 50 is energized, the solenoid 48 is drawn toward the stationary holding member 47, and the lock member 46 projects below the movable member 22, as indicated by broken lines in Fig. 3. So long as the actuating coil 50 is energized, the locking member 46 prevents the movable member 22 from being actuated downwardly.

To de-energize the actuating coil 50, it is necessary to return the master controller 25 to its "off" position. Because of this action, a short circuit can not be established from the trolley 7 through the line switch 9, series contactor 15 and switching device 19 to Ground, when the motors 1 and 2 are operating in series relation. The condition just mentioned also prevents a dynamic-braking circuit from being established while the motors 1 and 2 are energized and are operating in parallel relation.

From the above description, it is apparent that I have provided a switching device which may be operated manually, although preferably being foot-operated, to effect dynamic braking. Dynamic braking can be effected only when the motors 1 and 2 are disconnected from the source of electrical energy. By making it necessary for the motorman to dismount from the car or to go to some remote or inconvenient spot to actuate the latching member 38, before reenergizing the motors, it is apparent that the operator will cause dynamic braking of the motors 1 and 2 only when it is absolutely necessary.

While I have shown my invention in a preferred form, it is apparent that minor modifications may be made in the arrangement of circuits and in the apparatus employed, without departing from the spirit of my invention. I desire, therefore, to be limited only by the scope of the appended claims.

I claim as my invention:

1. In a control system, the combination with a motor, of a controller for governing said motor, means comprising a device for effecting electrical braking of said motor, means for preventing the operation of said motor after electrical braking, and means inaccessible from said controller for rendering said preventing means inoperative.

2. In a control system, the combination with a motor, of a controller for governing said motor, means comprising a pedal device for effecting dynamic braking of said motor, means for preventing the operation of said motor after dynamic braking, and means inaccessible from said controller for rendering said preventing means inoperative.

3. In a control system, the combination with a plurality of motors, of a controller for governing said motor, means comprising a device for effecting dynamic braking of said motors, means for preventing the operation of said motors upon the occurrence of dynamic braking, and means inaccessible from said controller for rendering said preventing means inoperative.

4. In a control system, the combination with a motor, of a controller having an "off" position and an operating position for governing said motor, and means comprising a switch for effecting electrical braking of said motor, said means being operative only upon said controller occupying its "off" position.

5. In a control system, the combination with a motor, of a line switch for energizing said motor, means comprising a pedal device for effecting dynamic braking of said motor and means for preventing the operation of said pedal device upon said line switch occupying its closed position.

6. In a control system, the combination with a motor, of a line switch for energizing said motor, means comprising a switching device for effecting dynamic braking of said motor, means for preventing the operation of said device upon said line switch occupying its closed position, and means for preventing the closure of said line switch upon said device occupying its dynamic-braking position.

7. The combination with a vehicle and a motor mounted upon said vehicle, of means for effecting electrical braking of said motor, means for preventing the energization of said motor after said braking, and means mounted upon a relatively inaccessible portion of said vehicle for rendering said preventing means inoperative.

8. The combination with a vehicle and a plurality of motors mounted upon said vehicle, of a line switch for energizing said motors, a master controller having an "off" position and a plurality of operating positions for governing said switch, means comprising a pedal device for effecting dynamic braking of said motors, means for preventing said device from operating prior to said master controller being returned to its "off" position, means for preventing the closure of said switch when said device occupies its dynamic-braking position, and a latching device for maintaining said pedal device in its dynamic-braking position.

In testimony whereof, I have hereunto subscribed my name this 6th day of July, 1921.

HARRY R. MEYER.